(12) United States Patent
Stiles et al.

(10) Patent No.: US 11,635,255 B1
(45) Date of Patent: Apr. 25, 2023

(54) LIQUID OR SUPERCRITICAL CARBON DIOXIDE CAPTURE FROM EXHAUST GAS

(71) Applicant: Axip Energy Services, LP, Dallas, TX (US)

(72) Inventors: Robert Stiles, Dallas, TX (US); David Thomas Stiles, Austin, TX (US); Christopher Cory Vail, Dallas, TX (US); John Guoynes, Traverse City, MI (US); Robert Earl Ashley, Pottsboro, TX (US)

(73) Assignee: AXIP ENERGY SERVICES, LP, Dallas, TX (US)

( * ) Notice: Subject to any disclaimer, the term of this patent is extended or adjusted under 35 U.S.C. 154(b) by 0 days.

(21) Appl. No.: 17/658,605

(22) Filed: Apr. 8, 2022

(51) Int. Cl.
| F25J 3/06 | (2006.01) |
| F01K 25/10 | (2006.01) |
| F25J 3/02 | (2006.01) |
| B01D 53/26 | (2006.01) |
| B01D 53/24 | (2006.01) |
| B01D 53/00 | (2006.01) |

(52) U.S. Cl.
CPC ............ *F25J 3/067* (2013.01); *B01D 53/002* (2013.01); *B01D 53/24* (2013.01); *B01D 53/265* (2013.01); *F01K 25/103* (2013.01); *F25J 3/0219* (2013.01); *F25J 3/0257* (2013.01); *F25J 3/0266* (2013.01); *F25J 2210/70* (2013.01); *F25J 2215/42* (2013.01); *F25J 2215/80* (2013.01); *Y02C 20/40* (2020.08)

(58) Field of Classification Search
CPC ....... F01K 25/103; Y02C 20/40; F25J 3/0266; F25J 3/067; F25J 2215/80; B01D 53/002; B01D 53/24; B01D 53/265

USPC ........................................................... 62/617
See application file for complete search history.

(56) References Cited

U.S. PATENT DOCUMENTS

| 4,563,201 | A  | * | 1/1986 | Brundige, Jr. | ......... F25J 1/0248 62/910 |
| 9,441,504 | B2 | * | 9/2016 | Held | ..................... F01K 25/103 |
| 9,726,426 | B2 |   | 8/2017 | Butts | |
| 10,670,334 | B2 |   | 6/2020 | De et al. | |
| 10,677,160 | B2 |   | 6/2020 | Sundaram et al. | |
| 11,161,073 | B2 |   | 11/2021 | Mettler et al. | |
| 2006/0225386 | A1 | * | 10/2006 | Brouwers | ............... C10L 3/102 55/319 |
| 2008/0083226 | A1 | * | 4/2008 | Joshi | ........................ F02C 3/34 60/772 |
| 2008/0302133 | A1 |   | 12/2008 | Saysset et al. | |
| 2011/0167866 | A1 | * | 7/2011 | Evans-Beauchamp | ...................... F25J 3/067 60/684 |
| 2012/0090355 | A1 |   | 4/2012 | Johnson et al. | |
| 2013/0081409 | A1 | * | 4/2013 | Gonzalez Salazar | .. F25J 1/0225 62/3.1 |

(Continued)

FOREIGN PATENT DOCUMENTS

ES      2618290 B1    12/2017

*Primary Examiner* — John F Pettitt, III
(74) *Attorney, Agent, or Firm* — Klemchuk PLLC

(57) ABSTRACT

Carbon dioxide is recovered from an exhaust gas in the form of liquid carbon dioxide or supercritical carbon dioxide utilizing a rotary separator. Nitrogen gas recovered from the rotary separator can be expanded to provide cooling for carbon dioxide in a closed-loop CO2 power cycle that is used to cool the exhaust gas upstream of the rotary separator. The recovery can power itself and can produce excess electricity from waste heat.

20 Claims, 6 Drawing Sheets

(56) References Cited

U.S. PATENT DOCUMENTS

| | | | |
|---|---|---|---|
| 2013/0298764 A1* | 11/2013 | Lardy | B01D 19/0036 |
| | | | 95/35 |
| 2014/0007590 A1* | 1/2014 | Huntington | F02C 3/04 |
| | | | 60/801 |
| 2016/0040557 A1* | 2/2016 | Vermeersch | F01K 25/103 |
| | | | 60/670 |
| 2016/0327333 A1 | 11/2016 | L'Air Liquide et al. | |
| 2018/0031315 A1 | 2/2018 | Baxter | |
| 2020/0309451 A1 | 10/2020 | Abarr et al. | |
| 2021/0187435 A1 | 6/2021 | L'Air Liquide et al. | |
| 2022/0178268 A1* | 6/2022 | Angel | F01K 25/103 |

\* cited by examiner

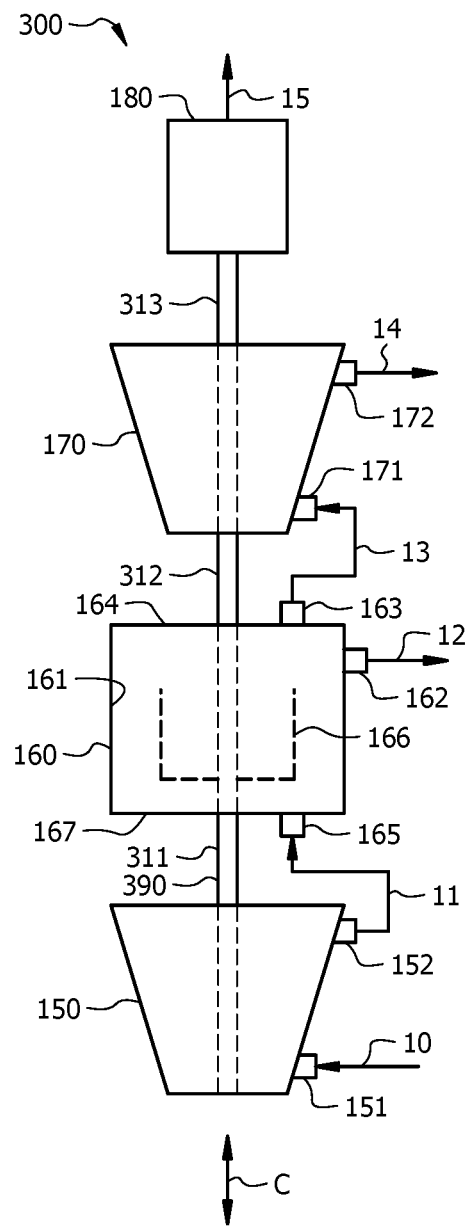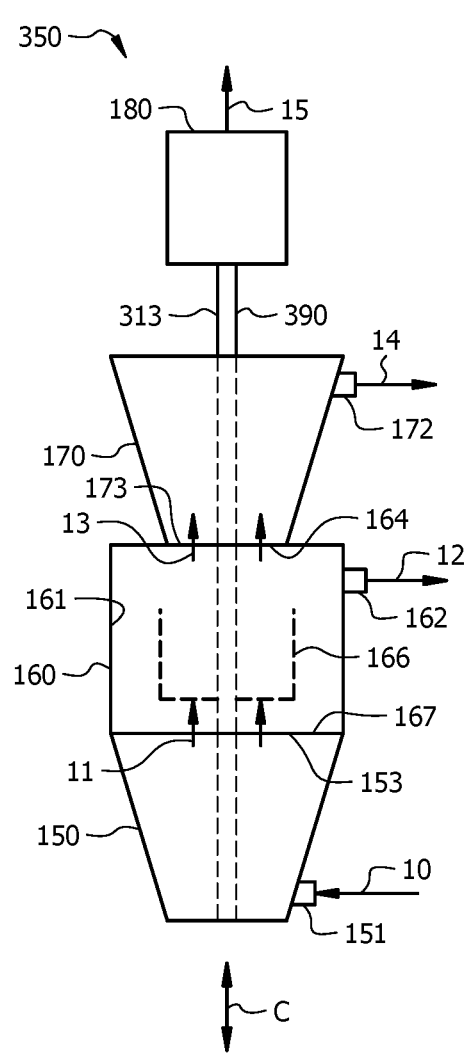
FIG. 3A
FIG. 3B

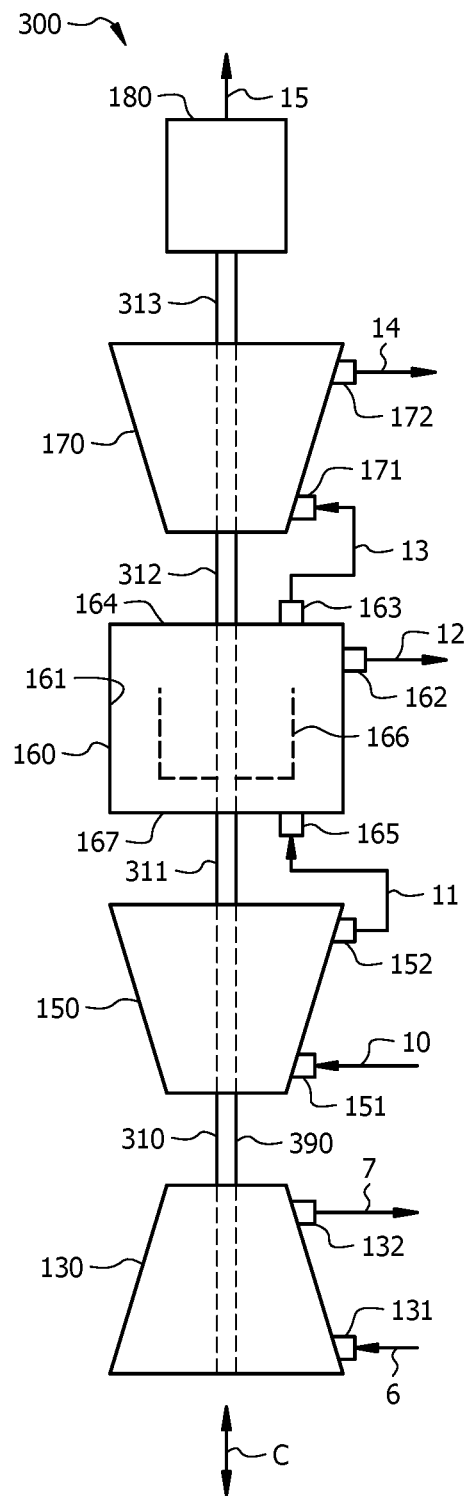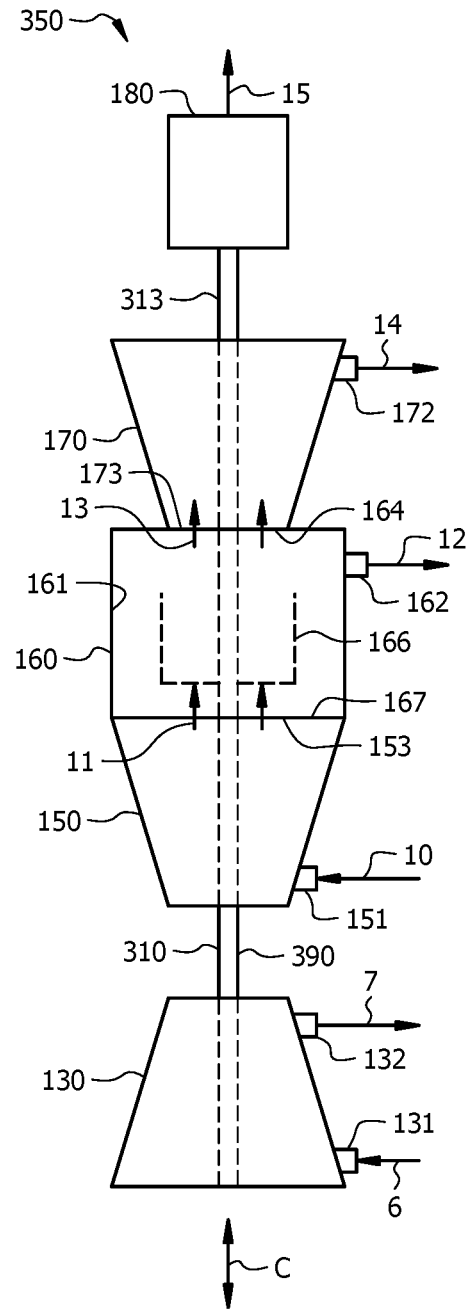
FIG. 3C
FIG. 3D

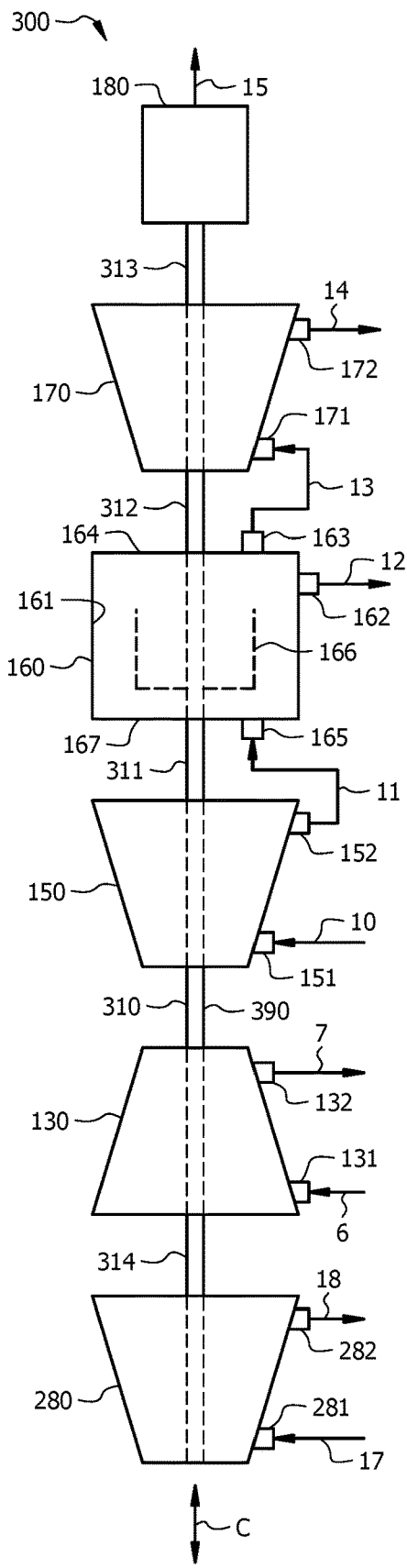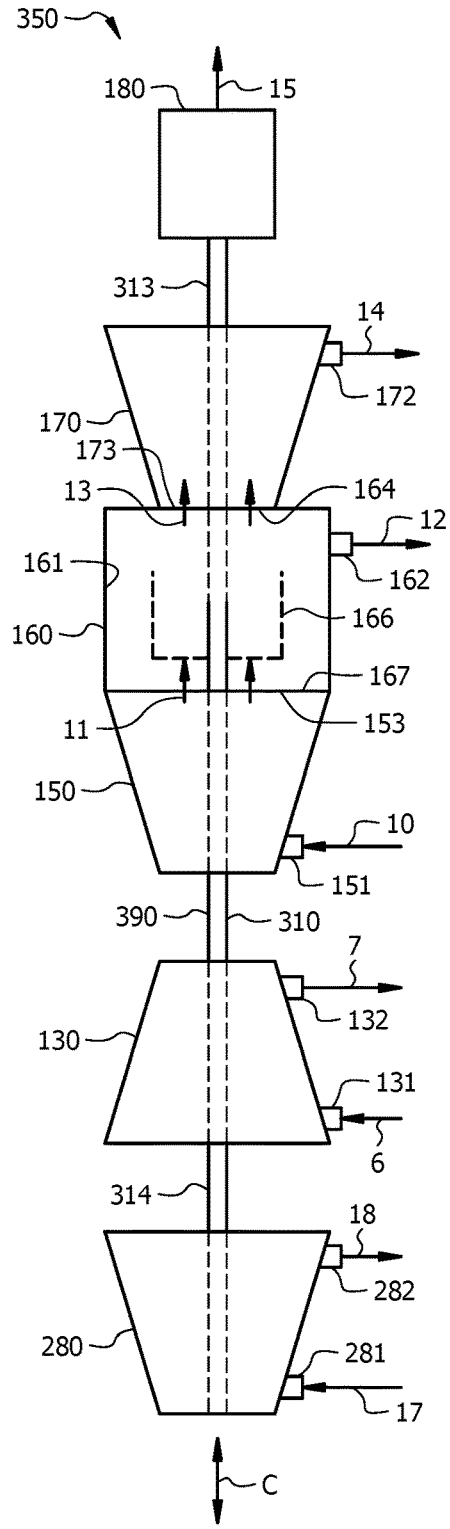
FIG. 3E
FIG. 3F

LIQUID OR SUPERCRITICAL CARBON DIOXIDE CAPTURE FROM EXHAUST GAS

FIELD OF THE DISCLOSURE

The present disclosure generally relates to the capture of carbon dioxide from an exhaust gas.

BACKGROUND

Exhaust gases can include carbon dioxide, water vapor, and nitrogen, among other chemical species present (including compounds considered pollutants), due to combustion of hydrocarbon-based fuels in an apparatus or device that converts the energy of fuel combustion to heat, mechanical energy, or other form of energy.

Absorption of carbon dioxide gas by a solvent, such as an amine-based solvent, is a common technique for removing carbon dioxide from an exhaust gas. Other techniques involves membrane separation (selective permeation or retention of carbon dioxide, adsorption of carbon dioxide onto an adsorbent surface, and carbon dioxide condensation under cryogenic conditions. These techniques, especially those operating under cryogenic conditions, can be very energy intensive.

There is an ongoing need for alternative techniques of capturing carbon dioxide from exhaust gas, and an ongoing need for techniques that can be more energy efficient.

SUMMARY

Processes and systems for liquid or supercritical carbon dioxide capture from exhaust gas are disclosed.

One process can include cooling, in a first heat exchanger, an exhaust gas stream comprising carbon dioxide gas, nitrogen gas, and water vapor to produce a cooled exhaust gas stream comprising the carbon dioxide gas, the nitrogen gas, and liquid water; separating the cooled exhaust gas stream into a liquid stream comprising the liquid water and a dehydrated exhaust gas stream comprising the carbon dioxide gas and the nitrogen gas; compressing dehydrated exhaust gas stream to form a compressed exhaust gas stream; cooling, in a second heat exchanger, the compressed exhaust gas stream to form a cooled compressed exhaust gas stream; expanding, in a first expander, the cooled compressed exhaust gas stream to produce a dense fluid stream comprising the nitrogen gas and a dense carbon dioxide; and separating, in a rotary separator, the dense fluid stream into a nitrogen product stream comprising the nitrogen gas and a carbon dioxide product stream comprising liquid or supercritical carbon dioxide.

Another process can include expanding, in a first expander, a cooled compressed exhaust gas stream to produce a dense fluid stream comprising the nitrogen gas and a dense carbon dioxide; and separating, in a rotary separator, the dense fluid stream into a nitrogen product stream comprising the nitrogen gas and a carbon dioxide product stream comprising liquid or supercritical carbon dioxide. This process can optionally include expanding, by a second expander, the nitrogen product stream and producing electricity from a generator.

Another process can include cooling an exhaust gas stream comprising carbon dioxide gas, nitrogen gas, and water vapor to produce a cooled exhaust gas stream comprising the carbon dioxide gas, the nitrogen gas, and liquid water. Cooling can include cross-exchanging the exhaust gas stream with a first carbon dioxide stream of a closed-loop CO2 power cycle, where a second carbon dioxide stream of the closed-loop CO2 power cycle is cooled using an expanded nitrogen product stream that is obtained as described herein, and cooling the second carbon dioxide stream with the expanded nitrogen product stream produces a liquid carbon dioxide stream that can be pumped as the first carbon dioxide stream to cool the exhaust gas stream. Alternatively, cooling can include cross-exchanging the exhaust gas stream with the CO2 product stream.

Another process can include increasing an outlet pressure of a rotary separator such that the rotary separator stops producing liquid carbon dioxide and starts producing supercritical carbon dioxide.

Another process can include decreasing an outlet pressure of a rotary separator such that the rotary separator stops producing supercritical carbon dioxide and starts producing liquid carbon dioxide.

A system can include a first heat exchanger, a first separator fluidly coupled to the first heat exchanger, a compressor fluidly coupled to the first separator, a second heat exchanger fluidly coupled to the compressor, a first expander fluidly coupled to the second heat exchanger, and a rotary separator fluidly coupled to the first expander. The system can also include a second expander fluidly coupled to the rotary separator, and a power generator mechanically coupled to the second expander. The first heat exchanger is configured to receive an exhaust gas stream and cool the exhaust gas stream to condense water vapor to a liquid. The liquid water is then removed in the first separator. The first separator emits a dehydrated exhaust gas, which is received by the compressor. The compressor emits a compressed dehydrated exhaust gas, which is received by the second heat exchanger configured to cool the compressed dehydrated exhaust gas. The second heat exchanger emits a cooled gas, which is received by the first expander. The first expander emits a dense fluid stream containing nitrogen gas and dense carbon dioxide. The first expander can be configured such that the dense carbon dioxide can be liquid carbon dioxide or liquid and gas carbon dioxide. The rotary separator is configured to receive the dense fluid stream and separate the dense fluid stream into a N2 product stream containing nitrogen gas and a CO2 product stream containing a liquid or supercritical carbon dioxide. The outlet pressure of the rotary separator can be set so that the rotary separator emits liquid carbon dioxide or supercritical carbon dioxide in the CO2 product stream. The outlet pressure of the rotary separator can also be adjusted so that the rotary separator changes from emitting liquid carbon dioxide to emitting supercritical carbon dioxide in the CO2 product stream, or vice versa. The power generator can generate electricity based on mechanical energy provided by the second expander, optionally in combination with the rotary separator, the first expander, or both. In some aspects, the CO2 product stream can be used to cool the exhaust gas in the first heat exchanger.

Another system can include a first heat exchanger having an exhaust gas side and a coolant side, a first separator fluidly coupled to a process stream side of the first heat exchanger, a compressor fluidly coupled to the first separator, a second heat exchanger fluidly coupled to the compressor, a first expander fluidly coupled to the second heat exchanger, a rotary separator fluidly coupled to the first expander, a second expander fluidly coupled to the rotary separator, and a closed-loop CO2 power cycle having a first carbon dioxide stream fluidly coupled to the coolant side of the first heat exchanger and a third heat exchanger having a coolant side fluidly coupled to the second expander. The closed-loop CO2 power cycle can include the third heat exchanger, a pump fluidly coupled a CO2 side of the third heat exchanger and to the coolant side of the first heat exchanger, and a CO2 expander coupled to the coolant side of the first heat exchanger and to the CO2 side of the third heat exchanger. The first heat exchanger is configured to receive an exhaust gas stream and cool the exhaust gas stream to condense water vapor to a liquid. The liquid water is then removed in the first separator. The first separator emits a dehydrated exhaust gas, which is received by the compressor. The compressor emits a compressed dehydrated exhaust gas, which is received by the second heat exchanger configured to cool the compressed dehydrated exhaust gas. The second heat exchanger emits a cooled gas, which is received by the first expander. The first expander emits a dense fluid stream containing nitrogen gas and dense carbon dioxide. The first expander can be configured such that the dense carbon dioxide can be liquid carbon dioxide or liquid and gas carbon dioxide. The rotary separator is configured to receive the dense fluid stream and separate the dense fluid stream into a nitrogen product stream containing nitrogen gas and a CO2 product stream containing a liquid or supercritical carbon dioxide. The outlet pressure of the rotary separator can be adjusted set so that the rotary separator emits liquid carbon dioxide or supercritical carbon dioxide. The outlet pressure of the rotary separator can also be adjusted so that the rotary separator changes from emitting liquid carbon dioxide to emitting supercritical carbon dioxide in the CO2 product stream, or vice versa. The second expander is configured to expand the nitrogen product stream. The coolant side of the third heat exchanger in the closed-loop CO2 power cycle is configured to receive the expanded nitrogen product stream and use the expanded nitrogen product stream to cool carbon dioxide on the CO2 side of the third heat exchanger. The system can also include a first power generator mechanically coupled to the second expander. The first power generator can generate electricity based on mechanical energy provided by the second expander, optionally in combination with the rotary separator, the first expander, and the CO2 expander.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which:

FIG. 3A illustrates an assembly having the rotary separator in combination with an upstream expander and downstream expander for separation of nitrogen gas from liquid or supercritical carbon dioxide.

FIG. 3B illustrates another assembly having the rotary separator in combination with an upstream expander and downstream expander for separation of nitrogen gas from liquid or supercritical carbon dioxide.

FIG. 3C illustrates the assembly of FIG. 3A also having the compressor in FIGS. 1, 2A, and 2B.

FIG. 3D illustrates the assembly of FIG. 3B also having the compressor in FIGS. 1, 2A, and 2B.

FIG. 3E illustrates the assembly of FIG. 3C also having the CO2 expander in FIGS. 2A and 2B.

FIG. 3F illustrates the assembly of FIG. 3D also having the CO2 expander in FIGS. 2A and 2B.

DETAILED DESCRIPTION

Figure 1:
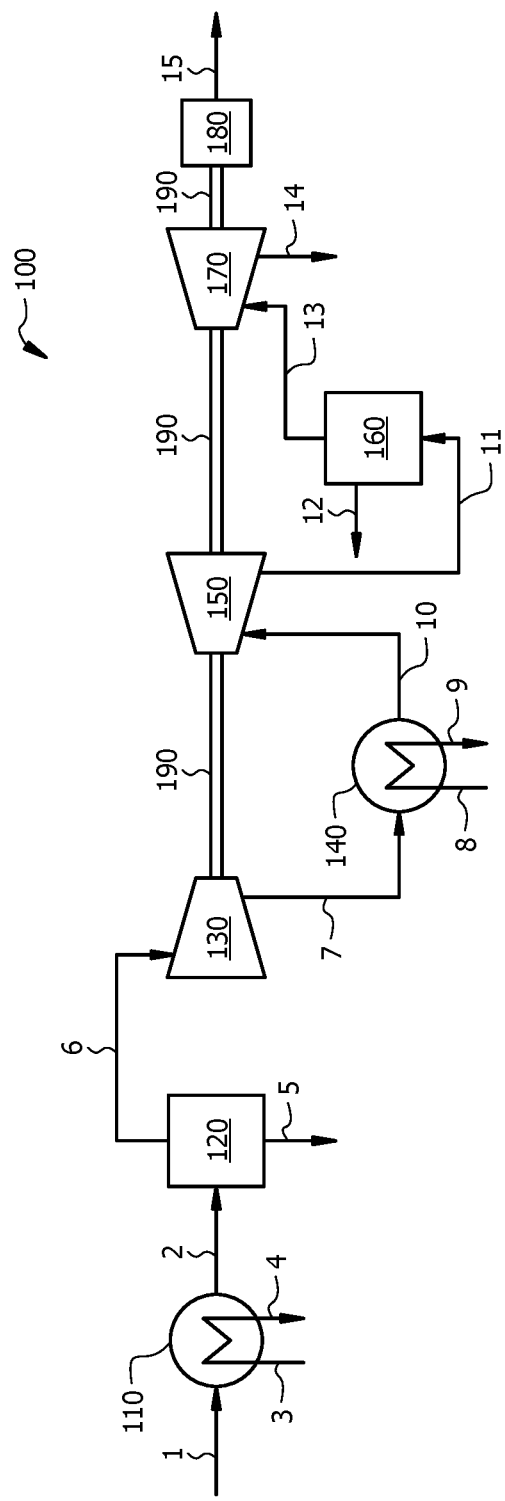
FIG. 1 illustrates a process flow diagram of a process for carbon dioxide capture from exhaust gas, utilizing a rotary separator to recover liquid or supercritical carbon dioxide.

It should be understood at the outset that although illustrative implementations of one or more embodiments are illustrated below, the disclosed systems and processes may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The term "about" when preceding a number includes the number and any range including the number that would be recognized by skilled artisans.

The terms "CO2" and "$CO_2$" are used as the chemical formula for carbon dioxide.

The terms "N2" and "$N_2$" are used as the chemical formula for nitrogen.

The term "exhaust gas" as used herein refers to a gaseous mixture containing nitrogen, carbon dioxide, and water vapor that is the combustion product produced by combustion of hydrocarbon-based fuels in an apparatus or device that converts the energy of fuel combustion to heat, mechanical energy, or other form of energy. Examples of combustion product are the exhaust gases produced by hydrocarbon fueled engines, turbines, furnaces, and boilers.

The term "dense carbon dioxide" as used herein refers to carbon dioxide that is present only in liquid phase, carbon dioxide that is present in liquid phase and gas phase, or carbon dioxide that is present in a supercritical state.

The term "stream" as used herein refers to a composition in a gas phase, in a liquid phase, in a solid phase, or any combination of phases. The term "stream" can additionally refer to and imply associated equipment, such as conduit, line, and pipe that is used to move the composition from one location to another. Alternatively, the term "stream" refers only to the composition contained within the equipment.

The term "dense fluid stream" as used herein refers to a stream containing dense carbon dioxide (carbon dioxide that is present only in liquid phase, carbon dioxide that is present in liquid phase and gas phase, or carbon dioxide that is present in a supercritical state).

Disclosed herein are processes and systems in which carbon dioxide in the form of liquid carbon dioxide or supercritical carbon dioxide is recovered from an exhaust gas. The processes and systems utilize a rotary separator to separate a dense fluid stream into a CO2 product stream comprising liquid or supercritical carbon dioxide and a nitrogen product stream comprising nitrogen gas. Power can be generated when expanding the nitrogen product stream. Additional embodiments utilize a closed-loop CO2 power cycle to cool the exhaust gas. The expanded nitrogen gas can be used to cool carbon dioxide in a heat exchanger of the closed-loop CO2 power cycle, and power can be generated when expanding carbon dioxide in the closed-loop CO2 power cycle. Moreover, the closed-loop CO2 power cycle can utilize a pump instead of a compressor, since cooling carbon dioxide with the expanded nitrogen product stream can lower the temperature of the carbon dioxide such that liquid carbon dioxide is present at the inlet of the pump. Power can be generated when expanding the carbon dioxide in the closed-loop CO2 power cycle.

FIG. 1 illustrates a process flow diagram of a process 100 for carbon dioxide capture from exhaust gas contained in exhaust gas stream 1, utilizing a rotary separator 160 to recover liquid or supercritical carbon dioxide in a CO2 product stream 12. The process 100 can be performed with equipment shown in FIG. 1, which can form a system configured to perform one or more steps of the process 100. The equipment used in the process 100 can include one or more of a first heat exchanger 110, a first separator 120, a compressor 130, a second heat exchanger 140, a first expander 150, a rotary separator 160, a second expander 170, and a power generator 180.

The exhaust gas stream 1 containing carbon dioxide gas, nitrogen gas, and water vapor can connect to an inlet of the first heat exchanger 110. In embodiments, the first heat exchanger 110 has an exhaust gas side and a coolant side. The exhaust gas stream 1 can connect to the inlet on the exhaust gas side of the first heat exchanger 110. A cooled exhaust gas stream 2 containing the carbon dioxide gas, nitrogen gas, and liquid water can connect to an outlet of the first heat exchanger 110 (e.g., on the exhaust gas side of the first heat exchanger 110) and to an inlet of the first separator 120. A liquid stream 5 containing liquid water can connect to a first outlet of the first separator 120, and a dehydrated exhaust gas stream 6 containing carbon dioxide gas and nitrogen gas can connect to a second outlet of the first separator 120. The dehydrated exhaust gas stream 6 can additionally connect to an inlet of the compressor 130. A compressed exhaust gas stream 7 containing the carbon dioxide gas and nitrogen gas can connect to an outlet of the compressor 130 and to an inlet of a second heat exchanger 140. In embodiments, the second heat exchanger 140 can have an exhaust gas side and a coolant side. The compressed exhaust gas stream 7 can connect to an inlet on the exhaust gas side of the second heat exchanger 140. A cooled compressed exhaust gas stream 10 containing the carbon dioxide gas and nitrogen gas can connect to an outlet of the second heat exchanger 140 (e.g., on the exhaust gas side of the second heat exchanger 140) and to an inlet of the first expander 150. A dense fluid stream 11 containing dense carbon dioxide and nitrogen gas can connect to an outlet of the first expander 150 and to an inlet of the rotary separator 160. Embodiments contemplate that the dense carbon dioxide is in a liquid phase; alternatively, a first part of the dense carbon dioxide is in a liquid phase and a second part of the dense carbon dioxide is in a gas phase; alternatively, the dense carbon dioxide is in a supercritical state (is supercritical carbon dioxide). A CO2 product stream 12 containing liquid or supercritical carbon dioxide can connect to a first outlet of the rotary separator 160, and a nitrogen product stream 13 containing nitrogen gas can connect to a second outlet of the rotary separator 160. The nitrogen product stream 13 can also connect to an inlet of the second expander 170. An expanded nitrogen product stream 14 containing nitrogen gas can connect to an outlet of the second expander 170.

Embodiments of the system shown in process 100 contemplate that one or more of the compressor 130, the first expander 150, the second expander 170, and the power generator 180 can be mechanically coupled by a drive shaft 190. As illustrated in FIG. 1, the compressor 130, the first expander 150, the second expander 170, and the power generator 180 are coupled by drive shaft 190. Mechanical energy generated by the expanders 150 and 170 can be used to drive the compressor 130. Excess mechanical energy that is not used to drive the compressor 130 can be used to drive the power generator 180, which produces electricity stream 15.

Coolant stream 3 can be connected to a coolant inlet on the coolant side of the first heat exchanger 110, and coolant stream 4 can be connected to a coolant outlet on the coolant side of the first heat exchanger 110. A first coolant in stream 3 can be used to cool the exhaust gas in the first heat exchanger 110, producing warmed coolant in stream 4. The first coolant can be any coolant suitable for cooling the exhaust gas to a temperature suitable for condensing the water vapor in the exhaust gas to form liquid water.

Coolant stream 8 can be connected to a coolant inlet on the coolant side of the second heat exchanger 140, and coolant stream 9 can be connected to a coolant outlet on the coolant side of the second heat exchanger 140. A second coolant in stream 8 can be used to cool the compressed exhaust gas in the second heat exchanger 140, producing warmed coolant in stream 9. The second coolant can be any coolant or suitable for cooling nitrogen and carbon dioxide in the compressed exhaust gas stream 7 to a temperature suitable for forming dense carbon dioxide in the dense fluid stream 11 after expansion in expander 150.

The process 100 includes cooling, in the first heat exchanger 110, the exhaust gas stream 1 comprising carbon dioxide gas, nitrogen gas, and water vapor to produce the cooled exhaust gas stream 2 comprising the carbon dioxide gas, the nitrogen gas, and liquid water. The first heat exchanger 110 can be embodied as a shell and tube heat exchanger or a plate and frame heat exchanger, for example. Water vapor generally condenses to liquid water in the first heat exchanger 110 (e.g., on the exhaust gas side of the first heat exchanger 110). The cooled exhaust gas stream 2 can have a gas phase containing carbon dioxide gas and nitrogen gas and a liquid phase containing liquid water. In embodiments, residual water vapor may be contained in the gas phase. The gas phase in the cooled exhaust stream 2 can have up to 25 vol % water vapor based on a total volume of the cooled exhaust gas stream 2.

The process 100 can also include separating the cooled exhaust gas stream 2 into a liquid stream 5 comprising the liquid water and the dehydrated exhaust gas stream 6 comprising the carbon dioxide gas and the nitrogen gas. Separating occurs in the separator 120. The separator 120 can be one or more vessels configured for liquid vapor separation, such as a vapor/liquid separator, a distillation tower, flash tank, or a rotary separator. That is, separation can occur based on differences in boiling points or differences in density. In embodiments where the exhaust gas stream 1 contains one or more impurities disclosed herein, the liquid water in liquid stream 5 can contain one or more impurities disclosed herein. The dehydrated exhaust gas stream 6 can contain components from the gas phase of the cooled exhaust gas stream 2, e.g., carbon dioxide gas and nitrogen gas.

The process 100 can also include compressing the dehydrated exhaust gas stream 6 to form a compressed exhaust gas stream 7. Compressing occurs in the compressor 130. The compressor 130 can be embodied as equipment configured for a single stage or multiple stages of compression to produce the compressed exhaust gas stream 7. A pressure of the compressed exhaust gas stream 7 can be in a range of from about 100 psia to about 500 psia; alternatively, from about 200 psia to about 400 psia; alternatively, from about 300 psia to about 400 psia; alternatively, about 300, 310, 320, 330, 340, 350, 360, 370, 380, 390, or 400 psia. A temperature of the compressed exhaust gas stream 7 can be in a range of from about 200° F. to about 500° F.; alternatively, from about 250° F. to about 400° F.; alternatively, from about 250° F. to about 350° F.; alternatively, about 250, 260, 270, 280, 290, 300, 310, 320, 330, 340, or 350° F.

The process 100 can also include cooling, in the second heat exchanger 140, the compressed exhaust gas stream 7 to form a cooled compressed exhaust gas stream 10. The second heat exchanger 140 can be embodied as a shell and tube heat exchanger or a plate and frame heat exchanger, for example. The second heat exchanger 140 can be configured to cool the compressed exhaust gas stream 7 sufficient to reduce the temperature by about 100, 150, 200, 250, or 300° F., for example.

A pressure of the cooled compressed exhaust gas stream 10 can be in a range of from about 100 psia to about 500 psia; alternatively, from about 200 psia to about 400 psia; alternatively, from about 300 psia to about 400 psia; alternatively, about 300, 310, 320, 330, 340, 350, 360, 370, 380, 390, or 400 psia. A temperature of the cooled compressed exhaust gas stream 10 can be in a range of about 50° F. to about 200° F.; alternatively, about 50, 60, 70, 80, 90, 100, 110, 120, 130, 140, 150, 160, 170, 180, 190, or 200° F.

The process 100 can also include expanding, in the first expander 150, the cooled compressed exhaust gas stream 10 to produce the dense fluid stream 11 comprising the nitrogen gas and a dense carbon dioxide. In some aspects, the dense carbon dioxide is a liquid phase of carbon dioxide; in alternative aspects, the dense carbon dioxide is a liquid phase of carbon dioxide and a gas phase of carbon dioxide; and in other alternative aspects, the dense carbon dioxide in supercritical carbon dioxide in a supercritical state. The first expander 150 can be embodied as a turbine or a rotary expander, for example.

Expanding in the first expander 150 can lower both the temperature and pressure such that the temperature and pressure of the dense fluid stream 11 are both lower than the temperature and pressure of the cooled compressed exhaust gas stream 10. At some temperatures and pressures, the dense carbon dioxide in dense fluid stream 11 is liquid phase; while at other temperatures and pressures, the dense carbon dioxide in the dense fluid stream 11 is partially in gas phase and partially in liquid phase; while at other temperatures and pressures, the dense carbon dioxide is in a supercritical state. In embodiments, the first expander 150 can be configured to expand the cooled compressed exhaust gas stream 10 sufficient to reduce i) the temperature by about 50° F. to about 150° F.; alternatively, by about 75° F. to about 125° F.; alternatively, by about 50, 60, 70, 80, 90, 100, 110, 120, 130, 140, or 150° F.; and ii) the pressure by about 100 psia to about 300 psia; alternatively, by about 150 psia to about 250 psia; alternatively, by about 170, 180, 190, 200, 210, 220, 230, or 240 psia.

A pressure of the dense fluid stream 11 can be in a range of from about 100 psia to about 200 psia; alternatively; about 125 to about 175 psia; alternatively, about 130, 140, 150, 160, or 170 psia. A temperature of the dense fluid stream 11 can be in a range of from about −100° F. to about 0° F.; alternatively, from about −90° F. to about −10° F.; alternatively, about −90, −80, −70, −60, −50, −40, −30, −20, or −10° F.

The process 100 can also include separating, in the rotary separator 160, the dense fluid stream 11 into the carbon dioxide (CO2) product stream 12 comprising liquid or supercritical carbon dioxide and the nitrogen product stream 13 comprising the nitrogen gas. The rotary separator 160 can be operated such that a phase of CO2 emitted from the rotary separator 160 can be determined and adjusted for CO2 product specification, for example, such that supercritical carbon dioxide, or alternatively liquid carbon dioxide, flows in the outlet of the rotary separator 160.

For example, the rotary separator 160 can receive the dense fluid stream 11 having carbon dioxide only in liquid phase, and the rotary separator 160 can be configured to generate a centrifugal force against the carbon dioxide gas that separates the liquid carbon dioxide from nitrogen gas, such that liquid carbon dioxide flows in the outlet of the rotary separator 160.

Alternatively, the rotary separator 160 can receive the dense fluid stream 11 having carbon dioxide only in liquid phase, and the rotary separator 160 can be configured to generate a centrifugal force against the liquid carbon dioxide that separates the liquid carbon dioxide from nitrogen gas and that converts the liquid carbon dioxide to supercritical carbon dioxide in the rotary separator 160, such that supercritical carbon dioxide flows in the outlet of the rotary separator 160.

Alternatively, the rotary separator 160 can receive the dense fluid stream 11 having carbon dioxide in liquid phase and gas phase, and the rotary separator 160 can be configured to generate a centrifugal force against the carbon dioxide in both liquid phase and gas phase that separates the carbon dioxide from the nitrogen gas and that converts the gas phase of carbon dioxide to additional liquid phase, such that liquid carbon dioxide flows in the outlet of the rotary separator 160.

Alternatively, the rotary separator 160 can receive the dense fluid stream 11 having carbon dioxide in liquid phase and gas phase, and the rotary separator 160 can be configured to generate a centrifugal force against the carbon dioxide in both liquid phase and gas phase that separates the gas phase and liquid phase of carbon dioxide from the nitrogen gas and converts the gas phase and liquid phase of carbon dioxide to supercritical state, such that supercritical carbon dioxide flows in the outlet of the rotary separator 160.

Alternatively, the rotary separator 160 can receive the dense fluid stream 11 having supercritical carbon dioxide, and the rotary separator 160 can be configured to generate a centrifugal force against the supercritical carbon dioxide that separates the supercritical carbon dioxide from the nitrogen gas, such that supercritical carbon dioxide flows in the outlet of the rotary separator 160.

Alternatively, the rotary separator 160 can receive the dense fluid stream 11 having supercritical carbon dioxide, and the rotary separator 160 can be configured to generate a centrifugal force against the supercritical carbon dioxide that separates the supercritical carbon dioxide from the nitrogen gas while converting the supercritical carbon dioxide to liquid phase, such that liquid carbon dioxide flows in the outlet of the rotary separator 160.

The process 100 contemplates that production of liquid carbon dioxide can be switched to production of supercritical carbon dioxide. In such aspects, the process 100 can include increasing an outlet pressure of a rotary separator 160 such that the rotary separator 160 stops producing liquid carbon dioxide and starts producing supercritical carbon dioxide. The outlet pressure can be increased, for example, by actuating a valve in the CO2 product stream 12 to be a smaller percentage open than when the rotary separator 160 was producing liquid carbon dioxide, creating a higher back pressure upstream of the valve which increases the outlet pressure of the rotary separator 160.

The process 100 contemplates that production of supercritical carbon dioxide can be switched to production of liquid carbon dioxide. In such aspects, the process 100 can include decreasing an outlet pressure of a rotary separator 160 such that the rotary separator 160 stops producing supercritical carbon dioxide and starts producing liquid carbon dioxide. The outlet pressure can be decreased, for example, by actuating a valve in the CO2 product stream 12 to be a larger percentage open than when the rotary separator 160 was producing supercritical carbon dioxide, creating a lower back pressure upstream of the valve which decreases the outlet pressure of the rotary separator 160. Separating the carbon dioxide in the rotary separator 160 provides an alternative to cryogenic separations. That is, instead of separating carbon dioxide from nitrogen based on boiling points, the disclosed processes and systems separate carbon dioxide and nitrogen based on density differences between the carbon dioxide and nitrogen. That is, conditions are facilitated such that carbon dioxide (in liquid phase, liquid phase and gas phase, or supercritical state) that is fed to the rotary separator 160 is forced radially outwardly by a rotor in the rotary separator 160 away from the lighter nitrogen gas that moves aggregately in a direction that is perpendicular to the movement of the carbon dioxide in the rotary separator 160, due to density of the carbon dioxide being greater than the density of the nitrogen gas.

Additionally, it has been found that providing conditions at which the carbon dioxide entering the rotary separator 160 is at least partially in liquid phase or in a supercritical state increases the throughput of the rotary separator 160, which decreases the size of the equipment and footprint of the skid having the equipment thereon relative to equipment and skid that are not configured as described.

In embodiments, the rotary separator 160 can be a centrifugal separator. All embodiments disclosed herein contemplate that no solid phase carbon dioxide is produced in the rotary separator 160, and that no solid phase carbon dioxide is contained in the CO2 product stream 12.

In embodiments, the CO2 product stream 12 comprises carbon dioxide in an amount greater than about 95 vol % and less than 100 vol % based on a total volume of the CO2 product stream 12.

In aspects, separating the dense fluid stream 11 can be accomplished via one or more of the following steps. Description of the following steps will be made with reference to components of the rotary separator 160 illustrated in FIGS. 3A and 3B. Separating the dense fluid stream 11 can include flowing the liquid or supercritical carbon dioxide on the inside of an outer wall 161 of the rotary separator 160, removing the liquid or supercritical carbon dioxide from the rotary separator 160 through a first outlet 162 fluidly connected to the outer wall 161, passing the nitrogen gas parallel to a longitudinal axis C of the rotary separator 160, and removing the nitrogen gas from a second outlet 163 fluidly connected to an end 164 of the rotary separator 160.

The process 100 can also include continuously flowing the liquid or supercritical carbon dioxide in the CO2 product stream 12 from the rotary separator 160. The process 100 can be performed on a continuous basis for continuous recovery of the liquid or supercritical carbon dioxide in the CO2 product stream 12.

A temperature of the CO2 product stream 12 can be in a range of from about −100° F. to about 0° F.; alternatively, from about −90° F. to about −10° F.; alternatively, about −90, −80, −70, −60, −50, −40, −30, −20, or −10° F. A pressure of the CO2 product stream 12 can be in a range of from about 200 psia to about 4,000 psia; alternatively, from about 1,100 psia to about 3,000 psia; alternatively, from about 1,200 psia to about 2,500 psia; alternatively, about 1,200, 1,300, 1,400, 1,500, 1600, 1,700, 1,800, 1,900, 2,000, 2,100, 2,200, 2,300, 2,400, or 2,500 psia.

Any temperature of the CO2 product stream 12 can be used in combination with any pressure of the CO2 product stream 12 disclosed herein.

A temperature of the nitrogen product stream 13 can be in a range of from about −100° F. to about 0° F.; alternatively, from about −90° F. to about −10° F.; alternatively, about −90, −80, −70, −60, −50, −40, −30, −20, or −10° F. A pressure of the nitrogen product stream 13 can be in a range of from about 100 psia to about 200 psia; alternatively, from about 110 psia to about 190 psia; alternatively, about 110, 120, 130, 140, 150, 160, 170, 180, or 190 psia.

In some alternative embodiments, the nitrogen product stream 13 can be used as coolant for the compressed exhaust gas stream 7. That is, the nitrogen product stream 13 can be connected to the coolant side of the second heat exchanger 140 and be used to cool the compressed exhaust gas stream 7. In such embodiments, the temperature of the nitrogen product stream 13 that is fed to the second expander 170 can be in a range of from about 100° F. to about 300° F.; alternatively, from about 150° F. to about 250° F.; alternatively, about 150, 160, 170, 180, 190, 200, 210, 220, 230, 240, or 250° F.

The process 100 can also include expanding, in the second expander 170, the nitrogen product stream 13 to form an expanded nitrogen product stream 14. The second expander 170 can be embodied as a turbine or a rotary expander, for example. The expanded nitrogen product stream 14 contains nitrogen gas in an amount of from about 90 vol % to about 99 vol %; alternatively, from about 95 vol % to about 98 vol %. A temperature of the expanded nitrogen product stream 14 can be in a range of from about −100° F. to about 0° F.; alternatively, from about −50° F. to about 0° F.; alternatively, about −50, −40, −30, −20, −10, or 0° F. A pressure of the expanded nitrogen product stream 14 can be in a range of from about 14.7 psia to about 100 psia; alternatively, from about 14.7 psia to about 50 psia; alternatively, from about 14.7 psia to about 30 psia; alternatively, about 15, 16, 17, 18, 19, 20, 21, 22, 23, 24, 25, 26, 27, 28, 29, or 30 psia.

Figure 2A:
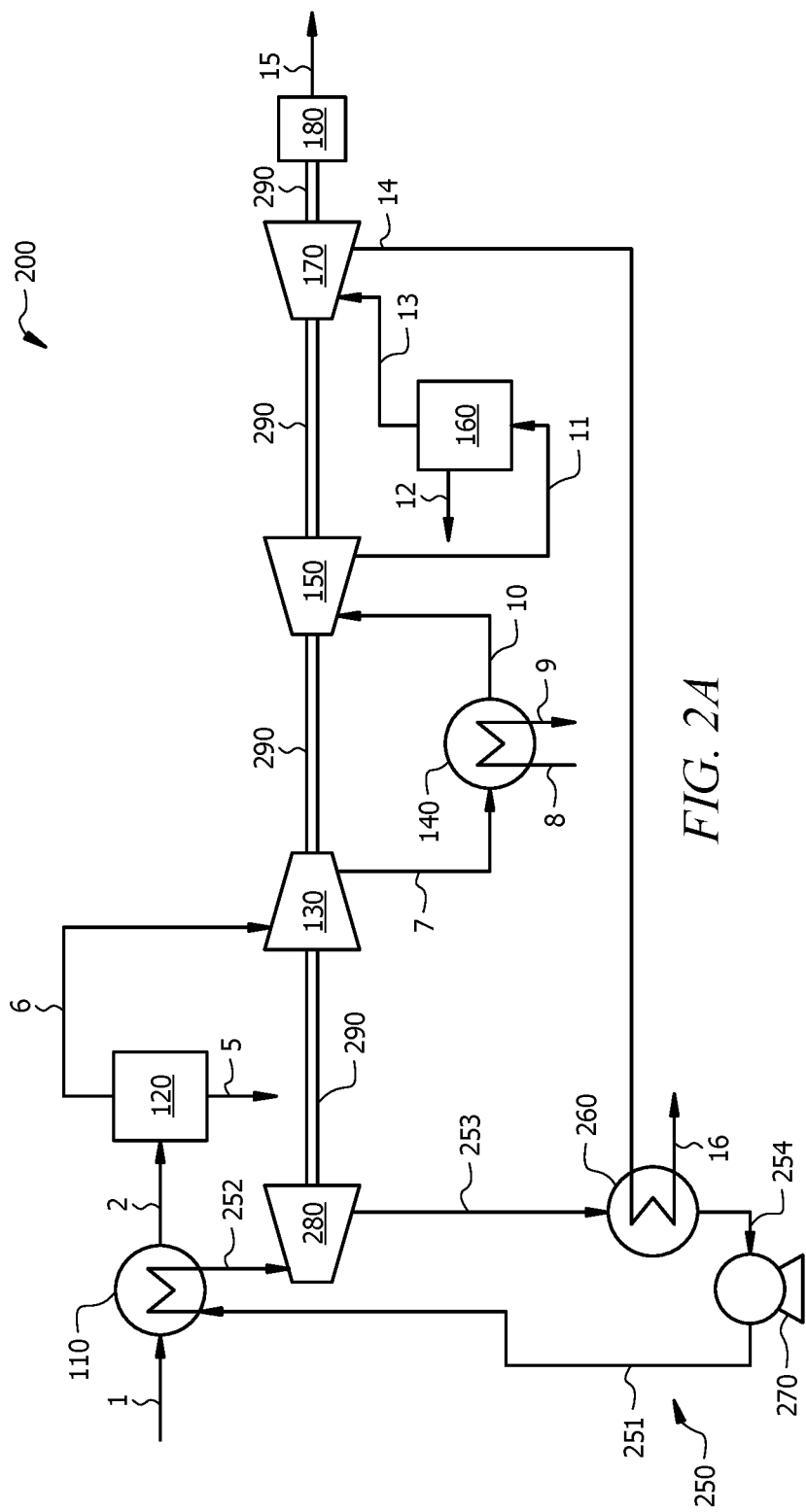
FIG. 2A illustrates a process flow diagram of another process for carbon dioxide capture from exhaust gas, utilizing a rotary separator to recover liquid or supercritical carbon dioxide and a closed-loop CO2 power cycle to cool the exhaust gas.

FIG. 2A illustrates a process flow diagram of another process 200 for carbon dioxide capture from exhaust gas contained in exhaust gas stream 1, utilizing the rotary separator 160 to recover liquid or supercritical carbon dioxide in the CO2 product stream 12 and a closed-loop CO2 power cycle 250 to cool the exhaust gas received in the heat exchanger 110 from the exhaust gas stream 1.

The process 200 can be performed with equipment shown in FIG. 2A, which can form a system configured to perform one or more steps of the process 200. The equipment used in the process 200 can include one or more of the first heat exchanger 110, the first separator 120, the compressor 130, the second heat exchanger 140, the first expander 150, the rotary separator 160, the second expander 170, the power generator 180, and the closed-loop CO2 power cycle 250. Carbon dioxide in the closed-loop CO2 power cycle 250 is used to cool exhaust gas in the first heat exchanger 110, instead of the first coolant as described in process 100 of FIG. 1. Nitrogen gas in the expanded nitrogen product stream 14 is used to cool carbon dioxide in the closed-loop CO2 power cycle 250.

The equipment 110, 120, 130, 140, 150, 160, 170, and 180, as well as streams 1, 2, 5, 6, 7, 8, 9, 10, 11, 12, 13, 14, and 15, of the process 200 of FIG. 2A is described for the process 100 in FIG. 1, and the description is not reproduced here.

The equipment used in process 200 in FIG. 2A additionally includes a closed-loop CO2 power cycle 250 and a drive shaft 290. The closed-loop CO2 power cycle 250 includes a heat exchanger 260, a pump 270, the first heat exchanger 110, and a CO2 expander 280. The drive shaft 290 mechanically couples the CO2 expander 280, the compressor 130, the first expander 150, the second expander 170, and the power generator 180.

Coolant carbon dioxide stream 251 can connect to an inlet of the first heat exchanger 110. A warmed carbon dioxide stream 252 can connect to an outlet of the first heat exchanger 110 and to an inlet of expander 280. An expanded carbon dioxide stream 253 can connect to an outlet of expander 280 and an inlet of heat exchanger 260. A cooled carbon dioxide stream 254 can connect to an outlet of the heat exchanger 260 and to an inlet of the pump 270. The outlet of the pump 270 can connect to the coolant carbon dioxide stream 251, forming the closed loop. That is, a closed loop is formed by the flow of carbon dioxide through stream 251, the first heat exchanger 110, stream 252, the expander 280, stream 253, heat exchanger 260, stream 254, pump 270, and again to stream 251.

In aspects, the closed-loop CO2 power cycle 250 can be embodied as a Brayton cycle. In such aspects, pump 270 illustrated in FIG. 2A can be replaced with a compressor, and carbon dioxide can be in supercritical state in all locations in the closed-loop CO2 power cycle 250.

In other aspects, such as that illustrated in the process 200 in FIG. 2A, the closed-loop CO2 power cycle 250 is a hybrid cycle that may contain carbon dioxide in supercritical state in stream 251, stream 252, stream 253, or combinations thereof, and carbon dioxide in liquid phase in stream 254. Reference to "hybrid cycle" herein indicates that a loop similar to a Brayton cycle is formed; however, at least one stream (e.g., at least stream 254) in the closed-loop CO2 power cycle 250 does not contain supercritical carbon dioxide.

Embodiments of the system shown in process 200 contemplate that one or more of the CO2 expander 280, the compressor 130, the first expander 150, the second expander 170, and the power generator 180 can be mechanically coupled by a common drive shaft 290. As illustrated in FIG. 2A, the CO2 expander 280, the compressor 130, the first expander 150, the second expander 170, and the power generator 180 are coupled by drive shaft 290. Mechanical energy generated by the expanders 150, 170, and 280 can be used to drive the compressor 130. Excess mechanical energy that is not used to drive the compressor 130 can be used to drive the power generator 180, which produces electricity stream 15.

The process 200 includes all the steps of process 100, modified as discussed below. The description of steps for process 100 that are illustrated in process 200 is applicable to the steps in process 200.

In the process 200, the first heat exchanger 110 can be configured as a cross-exchanger, and cooling the exhaust gas stream 1 can include cross-exchanging the exhaust gas stream 1 with the coolant carbon dioxide stream 251 in the first heat exchanger 110 to form the cooled exhaust gas stream 2 and a warmed carbon dioxide stream 252. The cross-heat exchange in the first heat exchanger 110 in process 200 is accomplished by heat exchange of the exhaust gas from exhaust gas stream 1 on the exhaust gas side of the first heat exchanger 110 with carbon dioxide from the closed-loop CO2 power cycle 250 on the coolant side of the first heat exchanger 110.

In embodiments, the carbon dioxide in coolant carbon dioxide stream 251 is in supercritical phase; alternatively, the carbon dioxide in coolant carbon dioxide stream 251 is in liquid phase; alternatively, the carbon dioxide in coolant carbon dioxide stream 251 can be in both a liquid phase and a gas phase.

A temperature of the coolant carbon dioxide stream 251 can be in the range of from about 0° F. to about 100° F.; alternatively, from about 0° F. to about 50° F.; alternatively, about 0, 10, 20, 30, 40, or 50° F. A pressure of the coolant carbon dioxide stream 251 can be in a range of from about 1,000 psia to about 4,000 psia; alternatively, from about 2,000 psia to about 4,000 psia; alternatively, from about 2,500 psia to about 3,500 psia; alternatively, about 2,500, 2,600, 2,700, 2,800, 2,900, 3,000, 3,100, 3,200, 3,300, 3,400, or 3,500 psia.

A temperature of the warmed carbon dioxide stream 252 can be in a range of from about 500° F. to about 1,500° F.; alternatively, from about 600° F. to about 1,400° F.; alternatively, about 600, 700, 800, 900, 1,000, 1,100, 1,200, 1,300, or 1,400° F. A pressure of the warmed carbon dioxide stream 252 can be in a range of from about 1,000 psia to about 4,000 psia; alternatively, from about 2,000 psia to about 4,000 psia; alternatively, from about 2,500 psia to about 3,500 psia; alternatively, about 2,500, 2,600, 2,700, 2,800, 2,900, 3,000, 3,100, 3,200, 3,300, 3,400, or 3,500 psia.

In embodiments, the pressure of the warmed carbon dioxide stream 252 is the same as the pressure of the coolant carbon dioxide stream 251. The carbon dioxide in warmed carbon dioxide stream 252 can be in supercritical phase; alternatively, the carbon dioxide in warmed carbon dioxide stream 252 can be in liquid phase; alternatively, the carbon dioxide in warmed carbon dioxide stream 252 can be in liquid phase and in gas phase.

The process 200 can also include expanding, in an expander 280 of the closed-loop CO2 power cycle 250, the warmed carbon dioxide stream 252 to form an expanded carbon dioxide stream 253. The expander 280 can be embodied as a turbine or rotary expander, for example.

A temperature of the expanded carbon dioxide stream 253 can be in a range of from about ambient temperature to about 500° F.; alternatively, from about 100° F. to about 500° F.; alternatively, about 100, 150, 200, 250, 300, 350, 400, 450, or 500° F. A pressure of the expanded carbon dioxide stream 253 can be in a range of from about 500 psia to about 1,500 psia; alternatively, from about 700 psia to about 1,200 psia; alternatively, about 700, 800, 900, 1,000, 1,100, or 1,200 psia.

In embodiments, both the temperature and the pressure of the expanded carbon dioxide stream 253 are lower than the temperature and pressure of the warmed carbon dioxide stream 252. In embodiments, the carbon dioxide in expanded carbon dioxide stream 253 can be in a supercritical state; alternatively, the carbon dioxide in expanded carbon dioxide stream 253 can be in a liquid phase; alternatively, the carbon dioxide in expanded carbon dioxide stream 253 can be in both a liquid phase and a gas phase.

In embodiments, the process 200 can also include generating, by the power generator 180, electricity 15 during the step of expanding the warmed carbon dioxide stream 252. The electricity 15 can be generated in embodiments where the drive shaft 290 couples the CO2 expander 280, the compressor 130, the first expander 150, the second expander 170, and the power generator 180.

The process 200 can also include cooling, in a heat exchanger 260 of the closed-loop CO2 power cycle 250, the expanded carbon dioxide stream 253 to form a cooled carbon dioxide stream 254. The heat exchanger 260 can be embodied as a shell and tube heat exchanger or a plate and frame heat exchanger, for example. In embodiments, the heat exchanger 260 can be a cross exchanger. In these embodiments, cooling the expanded carbon dioxide stream 253 can include cross-exchanging the expanded carbon dioxide stream 253 on the CO2 side of the heat exchanger 260 with the expanded nitrogen product stream 14 on the coolant side of the heat exchanger 260 to form the cooled carbon dioxide stream 254 and a warmed nitrogen product stream 16. The warmed nitrogen product stream 16 can have a pressure in a range of from about 14.7 psia to about 100 psia; alternatively, from about 14.7 psia to about 50 psia; alternatively, from about 14.7 psia to about 30 psia; alternatively, about 15, 16, 17, 18, 19, 20, 21, 22, 23, 24, 25, 26, 27, 28, 29, or 30 psia. The warmed nitrogen product stream 16 can have a temperature in a range of from about 200° F. to about 800° F.; alternatively, from about 400° F. to about 600° F.; alternatively, from about 450° F. to about 550° F.; alternatively, about 450, 460, 470, 480, 490, 500, 510, 520, 530, 540, or 550° F.

According to the disclosure, instead of cooling expanded carbon dioxide in the closed-loop CO2 power cycle 250 to about ambient temperature (e.g., a temperature in a range of about 85° F. to about 100° F. for US southern summer climate), the disclosed systems and processes can cool the expanded carbon dioxide to a temperature disclosed for the cooled carbon dioxide stream 254. Cooling the carbon dioxide in the heat exchanger 260 of the closed-loop CO2 power cycle 250 to a lower temperature can condense the carbon dioxide from a gas phase or supercritical state to the liquid phase, and thus allows for pump 270 to be utilized in the closed-loop CO2 power cycle 250 instead of a compressor. Efficiency is gained in the closed-loop CO2 power cycle 250 because the pump 270 uses significantly less power than a compressor.

In embodiments, the pressure of the cooled carbon dioxide stream 254 is the same as the pressure of the expanded carbon dioxide stream 253. In embodiments, the carbon dioxide in cooled carbon dioxide stream 254 is in a liquid phase. As described above, for embodiments of the closed-loop CO2 power cycle 250 that are configured as a Brayton cycle, the disclosure contemplates that carbon dioxide is present in cooled carbon dioxide stream 254 in a supercritical state.

A temperature of cooled carbon dioxide stream 254 can be the range of from about 0° F. to about 100° F.; alternatively, from about 0° F. to about 50° F.; alternatively, about 0, 10, 20, 30, 40, or 50° F. A pressure of cooled carbon dioxide stream 254 can be in a range of from about 500 psia to about 1,500 psia; alternatively, from about 700 psia to about 1,200 psia; alternatively, about 700, 800, 900, 1,000, 1,100, or 1,200 psia.

The process 200 can also include pumping, by the pump 270, the cooled carbon dioxide to the first heat exchanger 110 in the coolant carbon dioxide stream 251. The pump 270 is generally configured to receive liquid carbon dioxide and to apply a pressure to the carbon dioxide such that the pressure of the coolant carbon dioxide stream 251 is greater than a pressure of the cooled carbon dioxide stream 254. The carbon dioxide in the coolant carbon dioxide stream 251 can be in liquid phase, in a combination of liquid phase and gas phase, or in supercritical state.

Figure 2B:
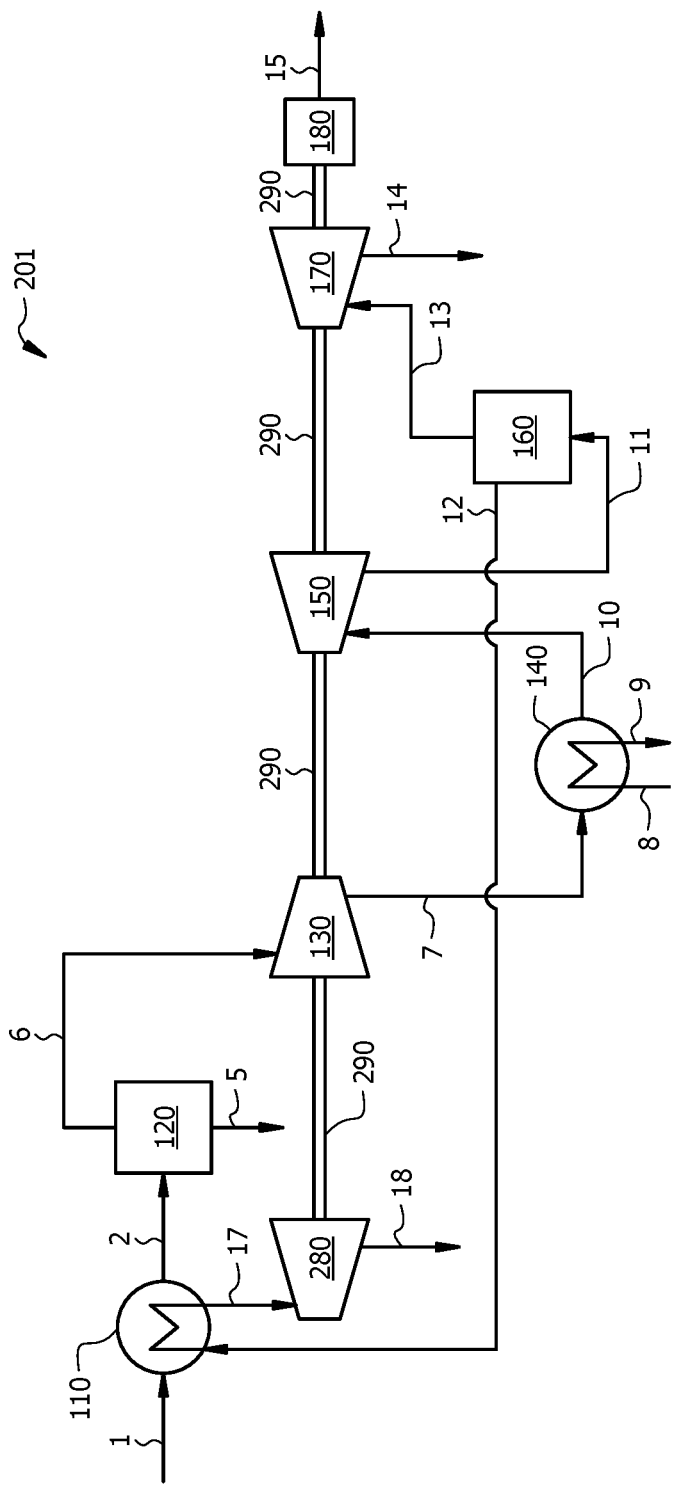
FIG. 2B illustrates a process flow diagram of another process for carbon dioxide capture from exhaust gas, utilizing a rotary separator to recover liquid or supercritical carbon dioxide and utilizing the recovered liquid or supercritical carbon dioxide to cool the exhaust gas.

FIG. 2B illustrates a process flow diagram of another process 201 for carbon dioxide capture from exhaust gas contained in exhaust gas stream 1, utilizing the rotary separator 160 to recover liquid or supercritical carbon dioxide in the CO2 product stream 12 and utilizing the CO2 product stream 12 to cool the exhaust gas received in the heat exchanger 110 from the exhaust gas stream 1.

The process 201 can be performed with equipment shown in FIG. 2B, which can form a system configured to perform one or more steps of the process 201. The equipment used in the process 201 can include one or more of the first heat exchanger 110, the first separator 120, the compressor 130, the second heat exchanger 140, the first expander 150, the rotary separator 160, the second expander 170, the power generator 180, and the CO2 expander 280. Carbon dioxide in the CO2 product stream 12 is used to cool exhaust gas in the first heat exchanger 110, instead of the first coolant as described in process 100 of FIG. 1. The warmed CO2 product stream 17 that leaves the first heat exchanger 110 can be expanded in the CO2 expander 280 to produce an expanded CO2 product stream 18.

The equipment 110, 120, 130, 140, 150, 160, 170, and 180, as well as streams 1, 2, 5, 6, 7, 8, 9, 10, 11, 12, 13, 14, and 15, of the process 201 of FIG. 2B is described for the process 100 in FIG. 1, and the description is not reproduced here.

The equipment used in process 201 in FIG. 2B additionally includes the CO2 expander 280 and a drive shaft 290. The CO2 expander 280 is configured to expand warmed carbon dioxide as is described in more detail below. The drive shaft 290 mechanically couples the CO2 expander 280, the compressor 130, the first expander 150, the second expander 170, and the power generator 180.

Embodiments of the system shown in process 201 contemplate that one or more of the CO2 expander 280, the compressor 130, the first expander 150, the second expander 170, and the power generator 180 can be mechanically coupled by a common drive shaft 290. As illustrated in FIG. 2B, the CO2 expander 280, the compressor 130, the first expander 150, the second expander 170, and the power generator 180 are coupled by drive shaft 290. Mechanical energy generated by the expanders 150, 170, and 280 can be used to drive the compressor 130. Excess mechanical energy that is not used to drive the compressor 130 can be used to drive the power generator 180, which produces electricity stream 15.

The process 201 includes all the steps of process 100, modified as discussed below. The description of steps for process 100 that are illustrated in process 201 is applicable to the steps in process 201.

In the process 201, the first heat exchanger 110 can be configured as a cross-exchanger, and cooling the exhaust gas stream 1 can include cross-exchanging the exhaust gas stream 1 with the $CO_2$ product stream 12 in the first heat exchanger 110 to form the cooled exhaust gas stream 2 and a warmed CO2 product stream 17. The cross-heat exchange in the first heat exchanger 110 in process 201 is accomplished by heat exchange of the exhaust gas from exhaust gas stream 1 on the exhaust gas side of the first heat exchanger 110 with carbon dioxide from the CO2 product stream 12 on the coolant side of the first heat exchanger 110.

In embodiments, the carbon dioxide in CO2 product stream 12 is in liquid phase; alternatively, the carbon dioxide in CO2 product stream 12 is in a supercritical state.

In process 201, and similar to process 100 and process 201, a temperature of the CO2 product stream 12 can be in a range of from about −100° F. to about 0° F.; alternatively, from about −90° F. to about −10° F.; alternatively, about −90, −80, −70, −60, −50, −40, −30, −20, or −10° F. A pressure of the CO2 product stream 12 can be in a range of from about 200 psia to about 4,000 psia; alternatively, from about 1,100 psia to about 3,000 psia; alternatively, from about 1,200 psia to about 2,500 psia; alternatively, about 1,200, 1,300, 1,400, 1,500, 1600, 1,700, 1,800, 1,900, 2,000, 2,100, 2,200, 2,300, 2,400, or 2,500 psia.

A temperature of the warmed CO2 product stream 17 can be in a range of from about 500° F. to about 1,500° F.; alternatively, from about 600° F. to about 1,400° F.; alternatively, about 600, 700, 800, 900, 1,000, 1,100, 1,200, 1,300, or 1,400° F. A pressure of the warmed CO2 product stream 17 can be in a range of from about 200 psia to about 4,000 psia; alternatively, from about 1,100 psia to about 3,000 psia; alternatively, from about 1,200 psia to about 2,500 psia; alternatively, about 1,200, 1,300, 1,400, 1,500, 1,600, 1,700, 1,800, 1,900, 2,000, 2,100, 2,200, 2,300, 2,400, or 2,500 psia.

In embodiments, the pressure of the warmed CO2 product stream 17 is the same as the pressure of the CO2 product stream 12. The carbon dioxide in warmed CO2 product stream 17 can be in supercritical phase; alternatively, the carbon dioxide in warmed CO2 product stream 17 can be in liquid phase; alternatively, the carbon dioxide in warmed CO2 product stream 17 can be in liquid phase and in gas phase.

The process 201 can also include expanding, in the CO2 expander 280, the warmed CO2 product stream 17 to form the expanded CO2 product stream 18. The expander 280 can be embodied as a turbine or rotary expander, for example.

A temperature of the expanded CO2 product stream 18 can be in a range of from about 300° F. to about 800° F.; alternatively, from about 400° F. to about 700° F.; alternatively, about 400, 450, 500, 550, 600, 650, or 700° F. A pressure of the expanded CO2 product stream 18 can be in a range of from about 100 psia to about 1,500 psia; alternatively, from about 100 psia to about 1,000 psia; alternatively, from about 100 psia to about 700 psia; alternatively, about 100, 200, 300, 400, 500, 600, or 700 psia.

In embodiments, both the temperature and the pressure of the expanded CO2 product stream 18 are lower than the temperature and pressure of the warmed CO2 product stream 17. In embodiments, the carbon dioxide in expanded CO2 product stream 18 can be in a gas phase; alternatively, the carbon dioxide in expanded CO2 product stream 18 can be in both a liquid phase and a gas phase.

In embodiments, the process 200 can also include generating, by the power generator 180, electricity 15 during the step of expanding the warmed CO2 product stream 17. The electricity 15 can be generated in embodiments where the drive shaft 290 couples the CO2 expander 280, the compressor 130, the first expander 150, the second expander 170, and the power generator 180.

In some aspects of the processes 100, 200, and 201, the exhaust gas stream 1 is impurity-lean, meaning that, impurities have been removed by techniques known in the art with the aid of this disclosure from a raw exhaust gas to produce the exhaust gas that is fed to the processes 100 and 200 in exhaust gas stream 1. Impurities can include SOx compounds (e.g., SO2), NOx compounds (e.g., NO2), HCl, Hg, or combinations thereof.

In other aspects, impurities (e.g., SOx compounds (e.g., SO2), NOx compounds (e.g., NO2), HCl, Hg, or combinations thereof) may be present in exhaust gas stream 1, and separator 120 may include multiple units, vessels, and equipment configured to remove the impurities along with liquid water from the exhaust gas to produce an impurity-lean dehydrated exhaust gas in stream 6.

FIG. 3A illustrates an assembly 300 comprising the rotary separator 160 in combination with the first expander 150 and the second expander 170 for separation of nitrogen gas from liquid or supercritical carbon dioxide. In optional embodiments, the assembly 300 can additionally include the power generator 180.

The first expander 150, the rotary separator 160, and the second expander 170 are driven by a common drive shaft 390. Alternative embodiments contemplate that only the first expander 150 and the rotary separator 160 are driven by the common drive shaft 390. Alternative embodiments contemplate that only the rotary separator 160 and the second expander 170 are driven by the common drive shaft 390.

As can be seen in FIG. 3A, portion 311 of drive shaft 390 extends between the first expander 150 and the rotary separator 160, portion 312 of drive shaft 390 extends between the rotary separator 160 and the second expander 170, and portion 313 of drive shaft 390 extends between the second expander 170 and the power generator 180.

In FIG. 3A, the first expander 150, the rotary separator 160, and the second expander 170 are separate and do not physically contact one another. FIG. 3A demonstrates that streams 10, 11, 12, 13, and 14 can be embodied as the compositions described herein along with the piping or conduit that is connected as illustrated. Cooled compressed exhaust gas stream 10 can be embodied as the composition described herein as well as piping that is connected to an inlet 151 of the first expander 150. Dense fluid stream 11 can be embodied as the composition described herein along with the piping that is connected to an outlet 152 of the first expander 150 and to an inlet 165 of the rotary separator 160. The CO2 product stream 12 is embodied as the composition described herein as well as the piping connected to the outlet 162 on the outer wall 161 of the rotary separator 160. The nitrogen product stream 13 is embodied as the composition described herein as well as the piping connected to the outlet 163 of the rotary separator 160 and the inlet 171 of the second expander 170. The expanded nitrogen product stream 14 is embodied as the composition described herein and the piping connected to the outlet 172 of the second expander 170.

FIG. 3A illustrates the rotor 166 contained within the rotary separator 160. The rotor 166 is configured to rotate about the longitudinal axis C, driven by drive shaft 390. The rotation of the rotor 166 urges the dense carbon dioxide in a direction within the rotary separator 160 that is radially outward toward the inside of the outer wall 161. The lighter nitrogen gas separates from the radially moving dense carbon dioxide, and the nitrogen gas flows in an aggregate direction that is parallel to the longitudinal axis C from the end 167 of the rotary separator 160 to the end 164 of the rotary separator 160, where the outlet 163 for the nitrogen gas is located. The continuous flow of dense fluid from dense fluid stream 11 into the rotary separator 160 provides motive force that moves the dense carbon dioxide in an aggregate direction that is parallel to the longitudinal axis C from the end 167 of the rotary separator 160 to the end 164 of the rotary separator 160, with the dense carbon dioxide (liquid or supercritical) exiting the rotary separator 160 via the outlet 162 that is on the outer wall 161.

In embodiments, the assembly 300 can be vertically oriented. That is, the longitudinal axis C of the assembly 300 is vertical. In alternative embodiments, the assembly 300 can be horizontally oriented.

FIG. 3B illustrates another assembly 350 comprising the rotary separator 160 in combination with the first expander 150 and the second expander 170 for separation of nitrogen gas from liquid or supercritical carbon dioxide. In optional embodiments, the assembly 350 can additionally include the power generator 180.

In FIG. 3B, the first expander 150, the rotary separator 160, and the second expander 170 are driven by a common drive shaft 390. Alternative embodiments contemplate that only the first expander 150 and the rotary separator 160 are driven by the common drive shaft 390. Alternative embodiments contemplate that only the rotary separator 160 and the second expander 170 are driven by the common drive shaft 390.

As can be seen in FIG. 3B, no portion of drive shaft 390 extends between the first expander 150 and the rotary separator 160, and no portion of drive shaft 390 extends between the rotary separator 160 and the second expander 170. Portion 313 of drive shaft 390 extends between the second expander 170 and the power generator 180.

In FIG. 3B, the first expander 150 and the rotary separator 160 are connected end-to-end, and the rotary separator 160 and the second expander 170 are connected end-to-end. That is end 167 of rotary separator 160 is connected to end 153 of the first expander 150, and end 164 of rotary separator 160 is connected to end 173 of the second expander 170.

FIG. 3B demonstrates that streams 10, 12, and 14 can be embodied as the compositions described herein along with the piping or conduit that is connected as illustrated. FIG. 3B also demonstrates that streams 11 and 13 can be embodied only as the compositions described herein.

Cooled compressed exhaust gas stream 10 can be embodied as the composition described herein as well as piping that is connected to an inlet 151 of the first expander 150. Dense fluid stream 11 is embodied as the composition described herein and can flow directly from a hole or outlet on end 153 of the first expander 150 into a corresponding hole or outlet formed on end 167 of the rotary separator 160. The CO2 product stream 12 is embodied as the composition described herein as well as the piping connected to the outlet 162 on the outer wall 161 of the rotary separator 160. The nitrogen product stream 13 is embodied as the composition described herein and can flow directly from a hole or outlet on end 164 of the rotary separator 160 into a corresponding hole or outlet formed on end 173 of the second expander 170. The expanded nitrogen product stream 14 is embodied as the composition described herein and the piping connected to the outlet 172 of the second expander 170.

FIG. 3B also illustrates the rotor 166 contained within the rotary separator 160. The operation and function of the 166 and rotary separator 160 are the same as described for FIG. 3A, and the description is not reproduced here.

In embodiments, the assembly 350 can be vertically oriented. That is, the longitudinal axis C of the assembly 350 is vertical. In alternative embodiments, the assembly 350 can be horizontally oriented.

FIG. 3C illustrates the assembly 300 of FIG. 3A further comprising the compressor 130. The embodiment of assembly 300 illustrated in FIG. 3C can be utilized in the process 200 of FIG. 2A, for example. In FIG. 3C, the compressor 130, the first expander 150, the rotary separator 160, and the second expander 170 are driven by a common drive shaft 390. As can be seen in FIG. 3C, portion 310 of drive shaft 390 extends between the compressor 130 and the first expander 150. FIG. 3C demonstrates that streams 6 and 7 can be embodied as the compositions described herein along with the piping or conduit that is connected as illustrated. Dehydrated exhaust gas stream 6 can be embodied as the composition described herein as well as piping that is connected to an inlet 131 of the compressor 130. Compressed exhaust gas stream 7 can be embodied as the composition described herein along with the piping that is connected to an outlet 132 of the compressor 130.

FIG. 3D illustrates the assembly 350 of FIG. 3B further comprising the compressor 130. The embodiment of assembly 350 illustrated in FIG. 3D can be utilized in the process 200 of FIG. 2A, for example. In FIG. 3D, the compressor 130, the first expander 150, the rotary separator 160, and the second expander 170 are driven by a common drive shaft 390. As can be seen in FIG. 3D, portion 310 of drive shaft 390 extends between the compressor 130 and the first expander 150. FIG. 3D demonstrates that streams 6 and 7 can be embodied as the compositions described herein along with the piping or conduit that is connected as illustrated. Dehydrated exhaust gas stream 6 can be embodied as the composition described herein as well as piping that is connected to an inlet 131 of the compressor 130. Compressed exhaust gas stream 7 can be embodied as the composition described herein along with the piping that is connected to an outlet 132 of the compressor 130.

FIG. 3E illustrates the assembly 300 of FIG. 3C further comprising the CO2 expander 280. The embodiment of assembly 300 illustrated in FIG. 3E can be utilized in the process 201 of FIG. 2B, for example. In FIG. 3E, the CO2 expander 280, the compressor 130, the first expander 150, the rotary separator 160, and the second expander 170 are driven by a common drive shaft 390. As can be seen in FIG. 3E, portion 310 of drive shaft 390 extends between the compressor 130 and the first expander 150, and portion 314 of drive shaft 390 extends between the compressor 130 and the CO2 expander 280. FIG. 3E demonstrates that streams 6, 7, 17, and 18 can be embodied as the compositions described herein along with the piping or conduit that is connected as illustrated. Warmed CO2 product stream 17 can be embodied as the composition described herein as well as piping that is connected to an inlet 281 of the CO2 expander 280. Expanded CO2 product stream 18 can be embodied as the composition described herein along with the piping that is connected to an outlet 282 of the CO2 expander 280.

FIG. 3F illustrates the assembly 350 of FIG. 3D further comprising the CO2 expander 280. The embodiment of assembly 350 illustrated in FIG. 3F can be utilized in the process 201 of FIG. 2B, for example. In FIG. 3F, the CO2 expander 280, the compressor 130, the first expander 150, the rotary separator 160, and the second expander 170 are driven by a common drive shaft 390. As can be seen in FIG. 3F, portion 310 of drive shaft 390 extends between the compressor 130 and the first expander 150, and portion 314 of drive shaft 390 extends between the compressor 130 and the CO2 expander 280. FIG. 3F demonstrates that streams 6, 7, 17, and 18 can be embodied as the compositions described herein along with the piping or conduit that is connected as illustrated. Warmed CO2 product stream 17 can be embodied as the composition described herein as well as piping that is connected to an inlet 281 of the CO2 expander 280. Expanded CO2 product stream 18 can be embodied as the composition described herein along with the piping that is connected to an outlet 282 of the CO2 expander 280.

EXAMPLE

Operating conditions were simulated for the process 200 of FIG. 2A. The exhaust gas stream 1 was specified to have a composition of 10 vol % carbon dioxide, 71.5 vol % nitrogen, and 18.5 vol % water vapor. The process 200 was simulated such that liquid carbon dioxide was recovered in CO2 product stream 12 from the rotary separator 160. Table 1 below shows the stream conditions in the Example:

TABLE 1

| Stream No. | Temperature (° F.) | Pressure (psia) | Flow Rate (MMSCFD) |
|---|---|---|---|
| 1 | 1100 | 14.7 | 35 |
| 2 | 40 | 14.7 | 35 |
| 5 | 40 | 14.7 | 23 gal/min |
| 6 | 40 | 14.7 | 30 |
| 7 | 300 | 350 | 30 |
| 10 | 60 | 350 | 30 |
| 11 | −40 | 140 | 30 |
| 12 | −40 | 1760 | 32 gal/min |
| 13 | 180 | 140 | 27 |
| 14 | −20 | 20 | 27 |
| 251 | 20 | 3000 | — |
| 252 | 900 | 3000 | — |
| 253 | 280 | 1000 | — |
| 254 | 20 | 1000 | — |

Table 2 illustrates the power generated in stream 15 of the process 200 of the Example. Particularly, the power is generated by the power generator 180. The power generated by the power generator 180 is due to the power generator 180 being coupled to the first expander 150, the second expander 170, and the CO expander 280.

TABLE 2

| Expander | Power Generated (hp) |
|---|---|
| 150 and 170 | 3265 |
| 280 | 5515 |
| Total | 8760 |

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A process comprising:
cooling, in a first heat exchanger, an exhaust gas stream comprising carbon dioxide gas, nitrogen gas, and water vapor to produce a cooled exhaust gas stream comprising the carbon dioxide gas, the nitrogen gas, and liquid water;
separating the cooled exhaust gas stream into a liquid stream comprising the liquid water and a dehydrated exhaust gas stream comprising the carbon dioxide gas and the nitrogen gas;
compressing the dehydrated exhaust gas stream to form a compressed exhaust gas stream;
cooling, in a second heat exchanger, the compressed exhaust gas stream to form a cooled compressed exhaust gas stream;
expanding, in a first expander, the cooled compressed exhaust gas stream to produce a dense fluid stream comprising the nitrogen gas and a dense carbon dioxide; and
separating, in a rotary separator, the dense fluid stream into a nitrogen product stream comprising the nitrogen gas and a carbon dioxide product stream comprising supercritical carbon dioxide,
wherein a carbon dioxide outlet pressure of the rotary separator is greater than the critical pressure of carbon dioxide such that the rotary separator emits the supercritical carbon dioxide in the carbon dioxide product stream.

2. The process of claim 1, further comprising:
continuously flowing the liquid or supercritical carbon dioxide in the carbon dioxide product stream from the rotary separator.

3. The process of claim 1, wherein no solid phase carbon dioxide is produced.

4. The process of claim 1, wherein the step of separating the dense fluid stream comprises:
flowing the supercritical carbon dioxide on an outer wall of the rotary separator;
removing the supercritical carbon dioxide from the rotary separator through a first outlet fluidly connected to the outer wall;
passing the nitrogen gas parallel to a longitudinal axis of the rotary separator; and
removing the nitrogen gas from a second outlet fluidly connected to an end of the rotary separator.

5. The process of claim 1, wherein the first expander and the rotary separator are driven by a common drive shaft.

6. The process of claim 1, further comprising:
expanding, in a second expander, the nitrogen product stream to form an expanded nitrogen product stream.

7. The process of claim 6, wherein the first expander, the rotary separator, and the second expander are driven by a common drive shaft.

8. The process of claim 1, wherein the dense carbon dioxide comprises a liquid phase of carbon dioxide.

9. The process of claim 8, wherein the dense carbon dioxide further comprises a gas phase of carbon dioxide.

10. The process of claim 1, wherein the carbon dioxide product stream comprises carbon dioxide in an amount greater than about 95 vol % and less than 100 vol % based on a total volume of the carbon dioxide product stream.

11. The process of claim 1, wherein the first heat exchanger is a cross-exchanger, the process further comprising:
cross-exchanging the exhaust gas stream with a coolant carbon dioxide stream to form the cooled exhaust gas stream and a warmed carbon dioxide stream.

12. The process of claim 11, wherein the coolant carbon dioxide stream and the warmed carbon dioxide stream are part of a closed-loop CO2 power cycle.

13. The process of claim 12, further comprising:
cross-exchanging the exhaust gas stream with the coolant carbon dioxide stream to form the cooled exhaust gas stream and a warmed carbon dioxide stream; and
expanding, in a second expander that is in the closed-loop CO2 power cycle, the warmed carbon dioxide stream to form an expanded carbon dioxide stream.

14. The process of claim 13, wherein the second expander is mechanically coupled to a power generator, the process further comprising:
generating, by the power generator, electricity during the step of expanding the warmed carbon dioxide stream.

15. The process of claim 13, further comprising:
cooling, in a third heat exchanger that is in the closed-loop CO2 power cycle, the expanded carbon dioxide stream to form a cooled carbon dioxide stream.

16. The process of claim 15, further comprising:
pumping the cooled carbon dioxide stream to the first heat exchanger.

17. The process of claim 16, further comprising:
expanding, in a second expander, the nitrogen product stream to form an expanded nitrogen product stream.

18. The process of claim 17, wherein the second expander is mechanically coupled to a power generator, the process further comprising:
generating, by the power generator, electricity during the step of expanding the nitrogen product stream.

19. The process of claim 17, wherein the third heat exchanger is a cross-exchanger, the process further comprising:
cross-exchanging the expanded carbon dioxide stream and the expanded nitrogen product stream to form the cooled carbon dioxide stream and a warmed nitrogen product stream.

20. The process of claim 1, wherein the carbon dioxide outlet pressure of the rotary separator is set by a valve in the carbon dioxide product stream.

* * * * *